Jan. 16, 1962  J. R. COOKE  3,017,493
HEATED CAR SEAT
Filed Jan. 22, 1960
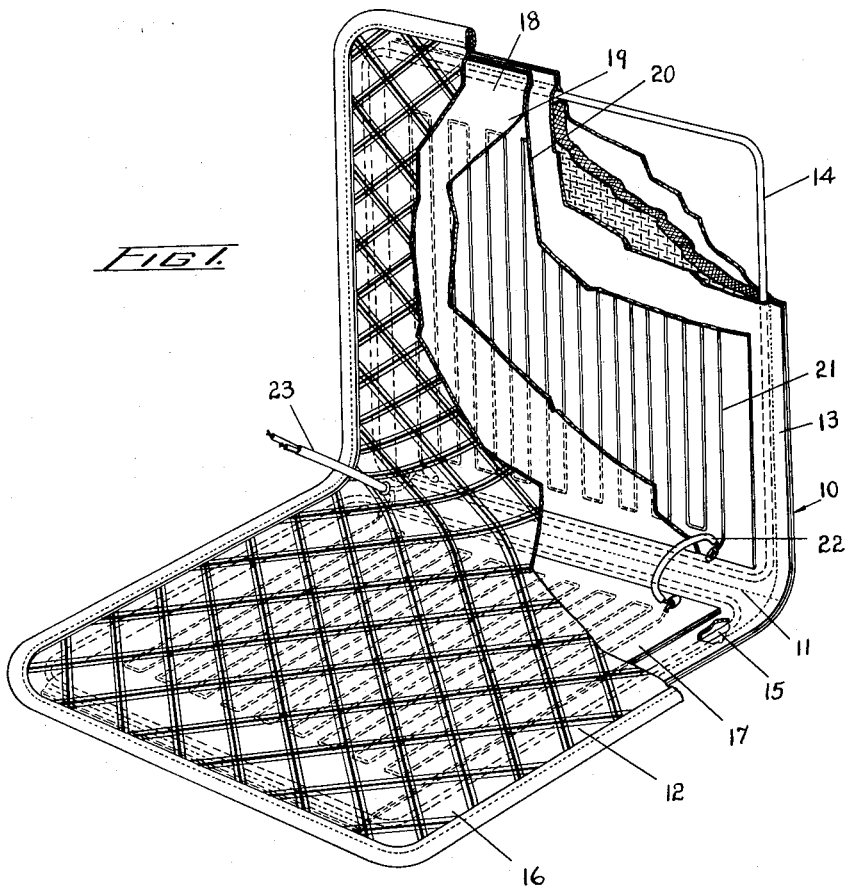
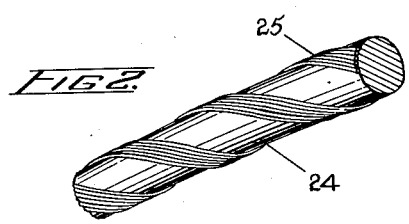
INVENTOR
JAMES ROBERTSON COOKE
BY
ATTORNEYS

3,017,493
HEATED CAR SEAT

James R. Cooke, Toronto, Ontario, Canada, assignor to Pyrexon Ray Company Limited, Toronto, Ontario, Canada, a company of Ontario, Canada
Filed Jan. 22, 1960, Ser. No. 4,065
2 Claims. (Cl. 219—46)

This invention relates to a portable electric heated seat for motor vehicles and in particular a heated car seat for use in passenger automobiles.

Automobile manufacturers extensively use synthetic fabrics in the upholstery of the car seats. Such fabrics have an extremely cold feeling, in cold climates, particularly as the automobile, in the wintertime, stands outside for long periods. Furthermore, the automobile seats, in addition, are covered, by the owner, with a plastic seat cover as a protection to the upholstery of the seat. Such plastic covering adds to the passenger's discomfort.

The portable heated seats heretofore proposed have consumed large amounts of electric energy. This is a serious disadvantage since automobiles have only a relatively low supply of such energy.

Another disadvantage of the portable heated seats heretofore proposed was that the heating element, when the seat was in use, had a very short life due to breakage caused by flexing of the wire forming the heating element.

One of the objects of the present invention is to provide a portable heated car seat which will overcome the foregoing disadvantages and will provide a low voltage heating element having a relatively low comsumption of electric energy and which has a high resistance to breaking down under continuous flexing action when in use.

A further object of the invention is to provide a portable heated car seat employing a resistance heating wire which, without the use of thermostat, will automatically maintain the heated seat at its predetermined temperature, thus avoiding overheating and also reducing the consumption of electric energy.

In carrying out the objects aforesaid, the portable heated car seat is provided with a flexible low voltage heating element having a high resistance to breaking down under continuous flexing action, the heating element comprising a thin flexible nylon core of circular cross-section and a resistance element formed of at least six strands of thin resistance wire wound spirally and tangentially around said core, all of said strands of the resistance element being grouped in side-by-side relation and preferably contiguous to each other, and having continuous contact with the core throughout its and their entire length.

For an understanding of the invention and the manner of its construction, reference is to be had to the following description and the accompanying drawings in which:

FIGURE 1 is a prospective view of the car seat with parts broken away to show the interior structure;

FIGURE 2 is an enlarged view of the heating element shown in FIGURE 1.

The heated car seat comprises an upholstered base 10 foldable along the centre line indicated by the numeral 11 to form a seat 12 and a back portion 13. Enclosed with the back portion 13 of the base 10 is a wire frame 14 which imparts rigidity to and stiffens the back member. A similar wire frame 15 is enclosed within the seat portion 12 of the base 10 and performs the same function as the wire frame 14. The base 10 is enclosed within a heat conductive cover 16 which may have decorative qualities.

The seat portion 12 and the back portion 13 are each provided with a separate heating pad 17, 18 respectively but as both pads are identical, it is only necessary to describe the construction of one of them. For that purpose, the construction of the heating pad 18 will be described. The heating pad 18 is formed of two sheets of heat conductive material 19, 20 but non-conductive to electricity, the sheets being substantially the same size as the back portion and a heating element 21 which is arranged in a sinuous fashion between the two sheets 20—21. The sheets 19, 20 and the element 21 are formed into a unit by adhesively securing the two sheets together in face-to-face relationship. The heating pad 17 is similarly constructed and the two pads are connected in series by the electric connecting wire 22, which is connected to the adjacent ends of the heating element to be hereinafter described, the other ends of the heating element being connected to an electric cord 23 which is provided with usual plug so that it can be attached to a suitable outlet such as the cigarette lighter socket located on the automobile instrument panel. The top edge of the heating pad is fastened to the top edge of the back portion 13 by means of stitching. It is a feature of this invention that the pad is not otherwise attached to the back. Likewise the forward edge of the pad 17 is secured to the front edge of the seat portion 12 by stitching and is not otherwise fastened to the seat portion 12. This allows the heating pads to have freedom of movement relative to the cover and the base and prevents the pad being subjected by unnecessary stresses.

The heating element also employs a novel construction. It consists of a thin yarn core 24 such as nylon, cotton, fibre glass or other flexible material non-conductive to electricity, and which has a smooth slippery surface. A heating element 25 consisting of six or more thin strands, in side-by-side relation, are wound tangentially in helicoid fashion around the core. It has been ascertained from actual practice that a heating element constructed according to the foregoing disclosure has a very high resistance to breakage in actual use.

What I claim is:

1. A portable electrically heated car seat comprising a seat portion, a back portion, a separate rigid stiffening frame surrounding each portion to maintain the same substantially flat, an envelope having separate pockets enclosing each portion and its associated frame, said envelope being foldable along a line between said portions, a separate low voltage flexible electric heating pad having a heating element permanently secured thereto overlaying the envelope above each pocket, the heating pad which overlays the seat portion being fastened to the envelope only along the front edge thereof and the heating pad which overlays the back portion being fastened to the envelope only along the top edge, whereby the respective heating pads having limited relative movement, and a covering of sheet material overlaying said pads and fastened along its edges to the perimeter of the envelope.

2. In a portable heated car seat according to claim 1 in which the electric heating pad comprises a flexible non-conductive base formed of two sheets of material, an electric heating element sandwiched between said sheets, said heating element comprising a flexible yarn core of circular cross section and a resistance element formed of at least six strands of thin electric resistance wire wound spirally around said core, all of said wire strands being grouped in side-by-side contiguous relation and having continuous sliding contact with said core, said heating element and said sheets being adhesively secured together to form a unitary structure.

References Cited in the file of this patent

UNITED STATES PATENTS

| | | |
|---|---|---|
| 2,323,478 | Lobl | July 6, 1943 |
| 2,456,015 | Orser | Dec. 14, 1948 |
| 2,698,893 | Ballard | Jan. 4, 1955 |
| 2,715,674 | Abbott et al. | Aug. 16, 1955 |
| 2,731,542 | Daniels | Jan. 17, 1956 |